United States Patent [19]
Uno et al.

[11] Patent Number: 4,951,930
[45] Date of Patent: Aug. 28, 1990

[54] INSULATOR FOR USE IN AUTOMOTIVE SUSPENSION OR THE LIKE

[75] Inventors: Takaaki Uno; Hiroshi Yamahata, both of Zama; Kazuo Chiba, Isehara, all of Japan

[73] Assignee: Nissan Motor Company, Limited, Yokohama, Japan

[21] Appl. No.: 370,787

[22] Filed: Jun. 23, 1989

Related U.S. Application Data

[62] Division of Ser. No. 619,482, Jun. 11, 1984, Pat. No. 4,889,328.

[30] Foreign Application Priority Data

Jul. 6, 1983 [JP] Japan ................. 58-122980

[51] Int. Cl.$^5$ ................. B60G 11/22; F16F 7/00
[52] U.S. Cl. ................. 267/293; 267/141.2
[58] Field of Search ................. 267/140.1 C, 140.1 E, 267/219, 293, 141.1–141.4, 141.7, 140.4, 276, 281, 258, 35; 248/559, 562, 607, 620, 638; 180/300, 312; 188/378–380

[56] References Cited

U.S. PATENT DOCUMENTS

| | | | |
|---|---|---|---|
| 4,157,227 | 6/1979 | Hamle | 267/141.1 X |
| 4,392,640 | 7/1983 | Kakimoto | 267/141.2 |
| 4,471,935 | 9/1984 | Chiba et al. | 267/141.2 X |

FOREIGN PATENT DOCUMENTS

58-170610 10/1983 Japan ................. 267/140.1

OTHER PUBLICATIONS

Nissan Service Weekly; vol. 401; Nov. 1979, pp. 98-99.
Nissan Service Weekly; Jun. 1980; p. 103.

*Primary Examiner*—Robert J. Oberleitner
*Attorney, Agent, or Firm*—Foley & Lardner, Schwartz, Jeffery, Schwaab, Mack, Blumenthal & Evans

[57] ABSTRACT

A vibration damping insulator for supporting a structural member on a vehicle chassis. The insulator comprises a first tubular member connected to said structural member, a second tubular member disposed coaxially within the first tubular member and connected to the vehicle chassis, a first elastomeric body interconnecting the first and second tubular members and arranged to undergo shear when the tubular members are displace in one direction and compression when the tubular members are displaced in a second direction relative to each other, a stiffening plate disposed in the first elastomeric body between the first and second tubular members, a vibratable mass, and a second elastomeric body separate from the first elastomeric body and interconnecting the vibratable mass and one of the tubular members. The second elastomeric body and the vibratable mass define a dynamic damper having a resonance characteristic which suppresses transmission of vibration from the structural member to the chassis.

5 Claims, 2 Drawing Sheets

INSULATOR FOR USE IN AUTOMOTIVE SUSPENSION OR THE LIKE

This application is a division of application Ser. No. 619,482, filed June 11, 1984, now U.S. Pat. No. 4,889,328.

BACKGROUND OF THE PRESENT INVENTION

1. Field of the Invention

The present invention relates generally to a suspension such as that used in an automotive vehicle and more specifically to an insulator or bush arrangement therefor which simultaneously provides good rigidity and vibration damping characteristics.

2. Description of the Prior Art

In nearly all suspension arrangements (for example see Nissan Service Weekly Vol. 401 November 1979 page 98), a problem is encountered in that elastomeric bushes interposed between members subject to vibration and a chassis or base which is to be isolated from the vibrations, such as the chassis of an automotive vehicle, are required to simultaneously support large weights (e.g. a vehicle chassis) and absorb relatively high frequency vibration. However, in order to provide the required rigidity and therefore support (viz., resistance to displacement), the insulator is required to be relatively hard. However, in order to absorb relatively high frequency vibration the elastomer used in the insulator should be relatively soft. Accordingly, in view of this conflict it is quite difficult to provide an arrangement which will adequately provide both functions.

One attempt to acheive the required characteristics is disclosed in Nissan Service Weekly issued in June 1980. This arrangement features the provision of a dynamic vibration damping device which is attached to a member of the suspension subject to vibration. This device upon being exited by vibration produces a similar vibration but with a 180 degree phase difference. The vibration produced by the dynamic damper and that which excites same, neutralize each other. This arrangement while proving effective undesirably increases the complexity and weight of the vehicle or device to which it is applied.

SUMMARY OF THE INVENTION

It is an object of the present invention to provide an insulator for a suspension which is simple and which simultaneously provides adequate rigidity and good vibration damping characteristics via the inclusion of a dynamic damping mechanism therein.

In brief, the above object is fullfilled by a insulator arrangement wherein the main elastomeric member is sufficiently rigid to limit displacement and which is provided with a vibratory or vibratile mass or masses which upon vibrating cancel vibrations which would otherwise be transmitted through the main elastomeric body.

More specifically, the present invention takes the form of a insulator for supporting a structural member subject to vibration on a chassis comprising: a first member connected to one of the structural member and the chassis a second member connected to the other of the structural member and the chassis, a first elastomeric body interconnecting the first and second members, a mass and a second elastomeric body which interconnects the mass and one of the first and second members, the mass being arranged to vibrate and suppress the transmission of vibration from the structural member to the chassis.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENT

Figure 1:
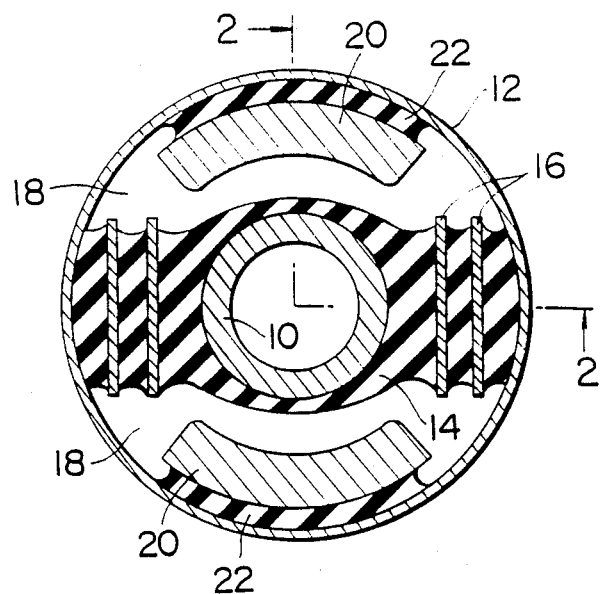
FIG. 1 is a sectional view of a first embodiment of the present invention.
Figure 2:
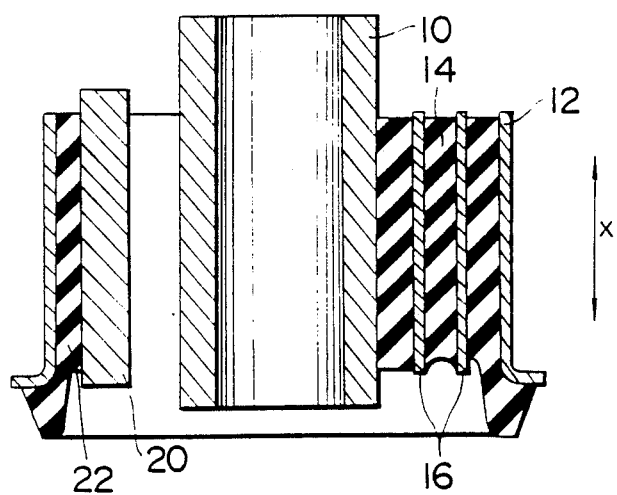
FIG. 2 is a section taken along section line II—II of FIG. 1.

FIGS. 1 and 2 show an embodiment of the present invention. In this arrangement coaxially arranged tubular inner and outer members 10, 12 are interconnected by a main elastomeric body 14. This body 14, as shown, includes pairs of plates 16 which are arranged parallel to each other and the axis about which the inner and outer members are coaxially arranged. The elastomeric body 14 is so shaped as to define spaces 18 within the outer tubular member 12. Masses 20 are disposed within the spaces 18 and connected with the outer tubular member 12 by auxiliary elastomeric members 22. The masses 20 are preferably arranged diametrically opposite one another in a symmetrical manner and so as to be sufficiently spaced from the inner and outer tubular members 10, 12 and the main elastomeric body 14 so that upon vibration they do not contact either the main elastomeric body 14 or the outer tubular member 12. The masses 20 may be formed of any material having a high density but are preferably selected from materials which can be securely bonded or vulcanzied to the auxiliary elastomeric members 22.

Figure 3:
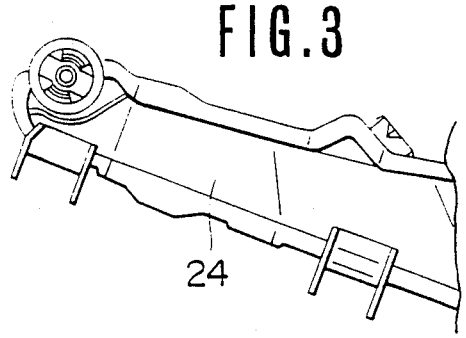
FIG. 3 is a partial plan view of a suspension member of a semi trailing arm type suspension which is connected to a chassis via insulators according the present invention.

FIG. 3 shows one of the above described insulators in a semi trailing arm type suspension. In this arrangement the insulators are disposed in suitable recepticle-like arrangements formed at each end of a suspension member 24 which extends laterally across the vehicle chassis (not shown). In this arrangement the inner tubular members 10 are connected to the chassis by bolts. The insulators are arranged to suspend the suspension member 24 in a manner that displacement of the suspension member 24 in the fore-and-aft direction of the vehicle shears the main elastomeric member 14 while left-right lateral movement compresses same.

By suitably selecting the mass of the masses 20 and the elastomer constituting the auxiliary elastomeric bodies 22, it is possible to endow on the system resonance characteristics which cause the masses 20 to vibrate at frequencies at which the main elastomeric member 14 fails to provide the desired characteristics but with a 180 degree phase difference. With this, vibration which excites the masses is neutralized by the vibration produced by same.

It should be noted that with the above described suspension arrangement, as the insulators are disposed at each end of the suspension member 24, the load applied to the vehicle body due to the primary sympathetic bending vibration can be effectively reduced.

There are two distinct members produced by each of the masses 20. The first is defined between the center of mass of each mass 20 and the resilent center of each auxiliary elastomeric body 22. The second is defined between the center of the shaft which is disposed through the inner tubular member 10 and the center of mass of each mass 20. However, as each of the masses 20 in the illustrated embodiment are symmetrically arranged with respect to the aformentioned connecting shaft center, the moments mutually cancel each other and thus the device is able to effectively damp vibration in the direction "X" indicated by the arrow in FIG. 2.

Figure 4:
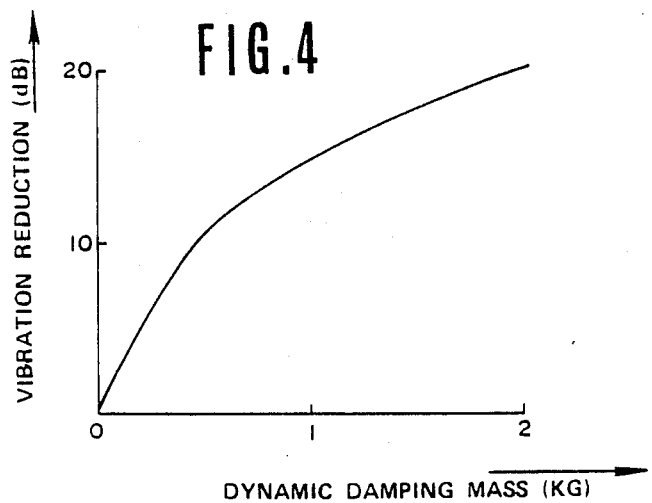
FIG. 4 is a graph showing in terms of vibration reduction provided by the dynamic damping vibratory masses and the weight of the masses, the performance characteristics obtained with the present invention when the mass of the vibratory masses are varied.

FIG. 4 shows the variation in damping characteristics which occurs as the mass of the masses 20 are varied (other variables being held constant). From this graph it is possible to select the appropriate mass for the particular vibration which is required to be damped.

Figure 5:
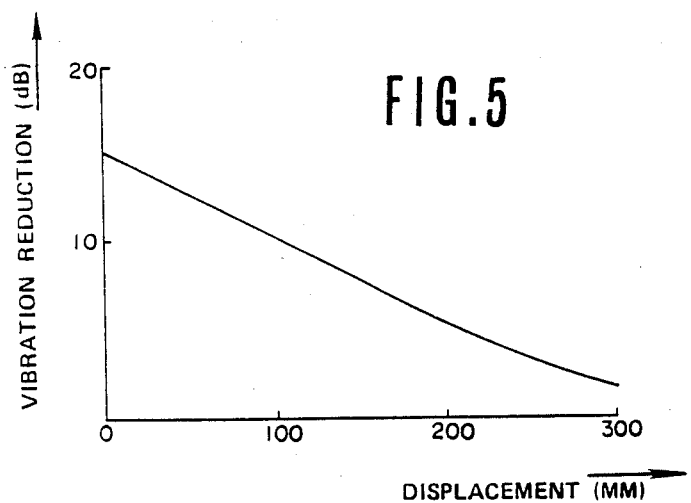
FIG. 5 is a graph showing in terms of the vibration reduction provided by the vibratory masses and the displacement of the masses from the end of the suspension member to which the insulator according to the present invention is applied the performance characteristics obtained with the present invention when the mass of the vibratory masses is held constant and the displacement thereof with respect to the ends of the previously mentioned suspension member is varied.

FIG. 5 is a graph plotted in terms of the vibration reduction provided by the invention and the distance of each mass from the end of the suspension member 24 and wherein the mass of the masses are held constant (at one 1 Kgm for example).

As will be apparent from the above graphs the present invention may provide satisfactory vibration damping characteristics simply by being provided at each end of a suspension member and without detrimental effect by the smallness of the vibratable masses per se.

Although the masses 20 of the above embodiment are disclosed as having identical vibrational characteristics, it is possible to arrange the masses 20 to each have a different mass and the elastomers constituting each of the auxiliary elastomeric bodies to have different spring characteristics. This makes it possible for each insulator to have at least two vibrational damping frequencies and thus be effective over a wider vibrational frequency range. However, with this kind of arrangement it is desirable to arrange same so that the sum of the respective moments is not excessively large. Furthermore, it is possible to connect the vibratory masses 20 to the inner member 10 or to the exterior of the outer tubular member 12 so long as the masses 20 may be permitted to move without interference from adjacent elements.

Thus, with the present invention it is possible to provide a single insulator unit wherein the main elastomeric body is sufficiently rigid as to provide the desired displacement limiting functions but which due to the provision of the resonating masses therein is able to damp the transmission of vibration which would otherwise be permitted to reach the chassis of the vehicle or the like.

What is claimed is:

1. An insulator for supporting a structural member subject to vibration on a chassis comprising:
   a first member connected to said structural member;
   a second member connected to said chassis;
   a first elastomeric body interconnecting said first and second members;
   a stiffening plate, said stiffening plate being disposed in said first elastomeric body at a location between said first and second members;
   a vibratable mass; and
   a second elastomeric body which is separate from said first elastomeric body, said second elastomeric body interconnecting said vibratable mass and one of said first and second members, said vibratable mass and said second elastomeric member defining dynamic damper means, said dynamic damper means having a resonance characteristic which is selected to suppress the transmission of vibration from said structural member to said chassis, and
   wherein said vibratable mass is arranged to vibrate at frequencies at which said first elastomeric body fails to damp the transmission of vibration therethrough and to have a mass greater than said stiffening plate.

2. An insulator as claimed in claim 1, wherein said first and second members are coaxially arranged tubular members which are interconnected by said first elastomeric body, said first elastomeric body being shaped so as to define a space between it and said outer of the two coaxially arranged tubular members, said vibratable mass being disposed in said space, said vibratable mass being arranged to damp vibrations which are transmitted in a direction parallel to the axes of said coaxially arranged tubular members.

3. In a vehicle
   a chassis;
   a structural member, said structural member extending laterally across said chassis;
   an insulator for supporting said structural member on said chassis, said insulator comprising:
   a first tubular member connected to said structural member;
   a second tubular member connected to said chassis, said second tubular member being disposed within and essentially coaxially with said first tubular member, said first and second tubular members being arranged essentially normally with respect to said chassis;
   a first elastomeric body interconnecting said first and second members, said first elastomeric body being arranged to undergo shear when said structural member is displaced in a first direction with respect to said chassis and undergo compression when displaced in a second direction which is normal to the first direction;
   a stiffening plate, said stiffening plate being disposed in said first elastomeric body at a location between said first and second members;
   a vibratable mass; and
   a second elastomeric body which is separate from said first elastomeric body, said second elastomeric body interconnecting said vibratable mass and one of said first and second members, said vibratable mass and said second elastomeric member defining dynamic damper means, said mass being selected in a manner to undergo resonance vibration when a predetermined vibration is transmitted from said structural member to said chassis in a direction which is essentially parallel with the axes of said first and second tubular members, said resonance vibration attenuating the amount of vibration which is transmitted from said structural member to said chassis.

4. An insulator for supporting a first structural member on a second structural member comprising:
- a first tubular member connected to said first structural member;
- a second tubular member connected to said second structural member, said second tubular member being disposed within and essentially coaxially with said first tubular member;
- a first elastomeric body interconnecting said first and second members, said first elastomeric body being arranged to undergo shear when first tubular member is displaced in a first direction with respect to said second tubular member and undergo compression when said first tubular member is displaced in a second direction with respect to said second tubular member, said second direction being normal to the first direction;
- a stiffening plate, said stiffening plate being disposed in said first elastomeric body at a location between said first and second members;
- a vibratable mass; and
- a second elastomeric body which is separate from said first elastomeric body, said second elastomeric body interconnecting said vibratable mass and one of said first and second members, said vibratable mass and said second elastomeric member defining dynamic damper means, said mass being selected in a manner to undergo resonance vibration when a predetermined vibration is transmitted from said structural member to said chassis in a direction which is essentially parallel with the axes of said first and second tubular members, said resonance vibration attenuating the amount of vibration which is transmitted from said structural member to said chassis.

5. An insulator for supporting a first structural member on a second structural member comprising:
- a first tubular member, said tubular member being connected to said first structural member;
- a second tubular member, said second tubular member being connected to said second structural member, said second tubular member being disposed within and essentially coaxially with said first tubular member;
- a first elastomeric body, said first elastomeric body interconnecting said first and second members, said first elastomeric body being disposed in said first tubular member and arranged and shaped to define first and second diametrically opposed recesses;
- a first stiffening plate, said first stiffening plate being disposed in said first elastomeric body at a location between said first and second tubular members;
- a second stiffening plate, said second stiffening plate being disposed in said first elastomeric body at a location between said first and second members and at a location diametrically opposite said second tubular member;
- a vibratable mass, said vibratable mass being disposed in one of said first and second recess; and
- a second elastomeric body which is separate from said first elastomeric body, said second elastomeric body interconnecting said vibratable mass and one of said first and second members, said vibratable mass and said second elastomeric member defining dynamic damper means, said mass being selected in a manner to undergo resonance vibration when a predetermined vibration is transmitted from said structural member to said chassis in a direction which is essentially parallel with the axes of said first and second tubular members, said resonance vibration attenuating the amount of vibration which is transmitted from said structural member to said chassis.

* * * * *